(12) United States Patent
Zhang et al.

(10) Patent No.: US 9,014,559 B2
(45) Date of Patent: Apr. 21, 2015

(54) METHODS FOR EFFICIENT TRANSMISSION IN OTN NETWORKS

(75) Inventors: Qiong Zhang, Plano, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 429 days.

(21) Appl. No.: 13/116,710

(22) Filed: May 26, 2011

(65) Prior Publication Data
US 2012/0301140 A1 Nov. 29, 2012

(51) Int. Cl.
| | |
|---|---|
| G02F 1/00 | (2006.01) |
| G02F 2/00 | (2006.01) |
| H01S 3/00 | (2006.01) |
| H04B 10/00 | (2013.01) |
| H04J 14/00 | (2006.01) |
| H04J 3/16 | (2006.01) |
| H04J 3/14 | (2006.01) |

(52) U.S. Cl.
CPC ........ *H04J 3/1652* (2013.01); *H04J 3/14* (2013.01)

(58) Field of Classification Search
CPC .............. H04B 10/50; H04J 1/00; H04J 3/00; H04J 3/14; H04J 3/1652; H04J 2211/001; H04L 1/00; H04L 41/08; H04L 41/0803; H04L 41/0806; H04L 41/813; H04L 41/823; H04L 45/00; H04L 45/16
See application file for complete search history.

(56) References Cited

U.S. PATENT DOCUMENTS

| | | | | |
|---|---|---|---|---|
| 2002/0093711 | A1* | 7/2002 | Simmons et al. | 359/125 |
| 2004/0105456 | A1* | 6/2004 | Lanzone et al. | 370/429 |

FOREIGN PATENT DOCUMENTS

WO   WO 2011/032315   3/2011   ............ H04B 10/00

OTHER PUBLICATIONS

Ou et al.; "Traffic Grooming for Survivable WDM Networks—Shared Protection"; IEEE Journal on Selected Areas in Communications, vol. 21, No. 9; pp. 1367-1383, 2003.
Li et al.; "Efficient Distributed Restoration Path Selection for Shared Mesh Restoration"; IEEE Transactions on Networking, vol. 11, No. 5; pp. 761-771, 2003.
Simmons; Optical Network Design and Planning; pp. 155-157, 2008.
Gendron Robert et al.; "The G.709 Optical Transport Network—An Overview," Application Note 153; EXFO Electro-Optical Engineering, Inc.; 7 pages, 2006.
Labourdette, Ph.D., Jean-Francois; "Shared Mesh Resoration in Optical Networks:" OFC 2004; 33 pages, 2004.

* cited by examiner

*Primary Examiner* — Darren E Wolf
(74) *Attorney, Agent, or Firm* — Baker Botts L.L.P.

(57) ABSTRACT

In accordance with some embodiments of the present disclosure a method for shared mesh protection in an optical transport network comprises provisioning a route for each of a plurality of working demands through the optical transport network. The method further comprises provisioning a route for backup demands corresponding to each of the plurality of working demands. The method additionally comprises packing into a single optical data unit a first backup demand corresponding to a first of the plurality of working demands and a second backup demand corresponding to a second of the plurality of working demands, wherein the first and second of the plurality of working demands share at least one common link in the optical transport network. The method also comprises unpacking the first and second backup demands from the optical data unit.

21 Claims, 5 Drawing Sheets

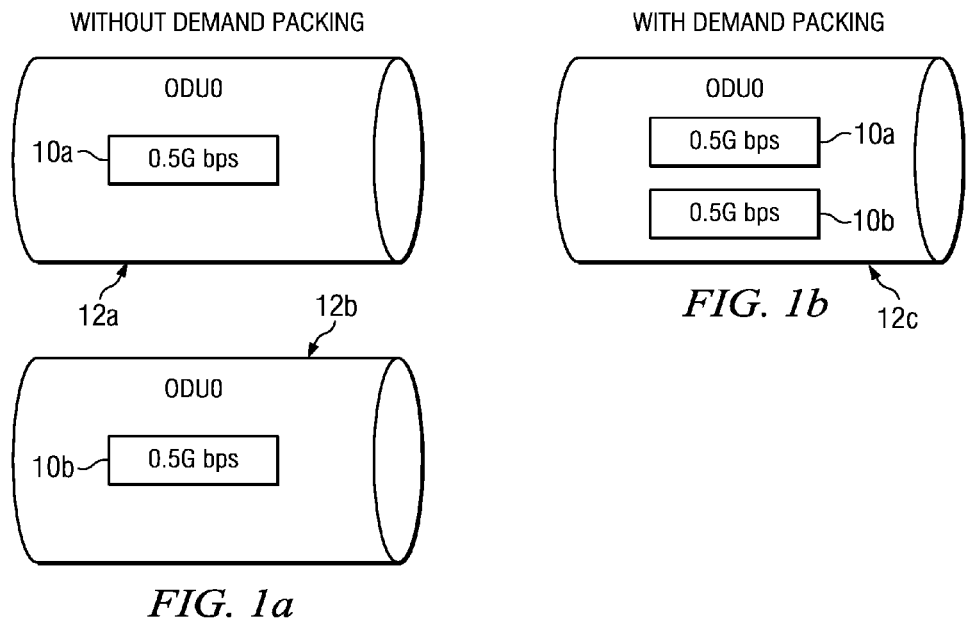
FIG. 1a
FIG. 1b
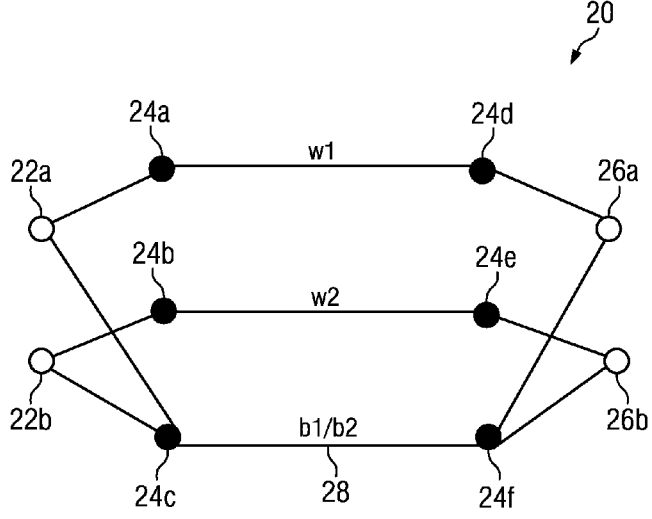
FIG. 2

METHODS FOR EFFICIENT TRANSMISSION IN OTN NETWORKS

TECHNICAL FIELD OF THE DISCLOSURE

The present disclosure relates generally to optical networks, more particularly, to methods for efficient transmission in optical transport networks.

BACKGROUND

A communication network allows nodes to communicate with other nodes. The communication of signals or data between and within nodes may be referred to as "traffic." A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. In some embodiments, a communication network may comprise an Optical Transport Network (OTN).

A failure at a node or link in the network may prevent traffic from reaching its intended destination. Networks may therefore provide for restoration in the event of a failure. One way to provide restoration is dedicated mesh protection. In dedicated mesh protection, the source may transmit traffic along two or more alternate routes through the network. Upon receiving the traffic, the destination decides which path to select based on, for example, the quality of the traffic signal received from each path. Dedicated mesh protection can provide for quick restoration in the case of a transmission failure. Because redundant paths may be permanently active, however, dedicated mesh protection may result in inefficient allocation of network resources.

Alternatively, the network may provide for shared mesh protection, in which traffic may be initially sent over a single primary path while a backup path may be reserved for use when necessary. In a shared mesh network, backup traffic is not necessarily transmitted at all times and, thus, it may be possible for multiple primary paths to share the same backup path. This sharing of backup paths may result in more efficient use of network resources compared to dedicated mesh protection.

SUMMARY

In accordance with some embodiments of the present disclosure a method for shared mesh protection in an optical transport network comprises provisioning a route for each of a plurality of working demands through the optical transport network. The method further comprises provisioning a route for backup demands corresponding to each of the plurality of working demands. The method additionally comprises packing into a single optical data unit a first backup demand corresponding to a first of the plurality of working demands and a second backup demand corresponding to a second of the plurality of working demands, wherein the first and second of the plurality of working demands share at least one common link in the optical transport network. The method also comprises unpacking the first and second backup demands from the optical data unit.

BRIEF DESCRIPTION OF THE DRAWINGS

For a more complete understanding of the present disclosure and its features and advantages, reference is now made to the following description, taken in conjunction with the accompanying drawings, in which:

FIGS. 1a and 1b depict packing multiple demands into a single optical data unit ("ODU");

FIG. 2 depicts an example of shared mesh protection in an OTN for multiple disjoint working demands;

DETAILED DESCRIPTION

Figure 3:
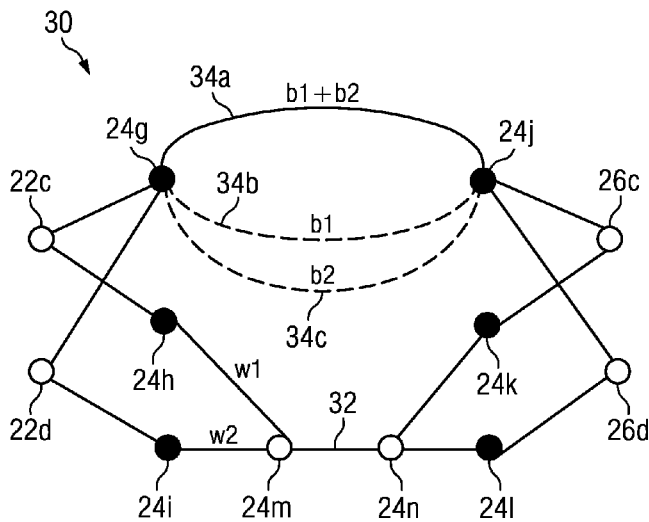
FIG. 3 depicts an example of shared mesh protection in an OTN for multiple working demands that share at least one common link.

A communication network may include nodes and links that facilitate communication between nodes within the network. The communication of signals or data between and within nodes may be referred to as "traffic."

A communication network allows nodes to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Traffic may be information transmitted, stored, or sorted within the communication network. Such traffic may comprise optical or electrical signals configured to encode audio, video, textual, or any other suitable data. The data may also be real-time or non-real-time. Traffic may be communicated via any suitable communications protocol including, without limitation, the Open Systems Interconnection (OSI) standard and Internet Protocol (IP). Additionally, traffic may be structured in any appropriate manner including, but not limited to, being structured in frames, packets, or an unstructured bit stream. A frame may include one or more data payloads and one or more headers or trailers used to facilitate communication through the network.

In some embodiments, a communication network may comprise an Optical Transport Network (OTN). Traffic may be transmitted between nodes within an OTN according to various protocols such as ITU G.709. The nodes may be, for example, central offices (CO) in a core OTN.

Communication networks may be conceptualized as including one or more layers that describe the operation of the network. In some cases, each layer has a corresponding frame structure, including a corresponding header and/or trailer containing information relevant to communication on the network layer.

Communication of traffic results in demands on the network. A demand indicates the need to send traffic of a certain bandwidth from a source node in the network to a destination node. Demands may be routed through the network, from source to destination, via intermediate nodes and links.

In network operation, traffic may occasionally not reach its intended destination as a result of failures along links or within nodes in the network. A communication network may provide for restoration in the event of network failures. To provide for restoration, the network may route a backup path and allocate backup resources for traffic that is additional to the primary traffic path or resource. The backup path may also be disjoint from the primary path. For instance, the backup path may be provisioned such that it does not include any resources (such as, for example, IP links, nodes, physical bandwidths, and light paths) that are included in the shared risk link group ("SRLG") of the primary path.

One way to provide restoration is dedicated mesh protection. In dedicated mesh protection, the source may transmit traffic along two or more alternate routes through the network. Upon receiving the traffic, the destination decides which path to select based on, for example, the quality of the traffic signal received from each path. Dedicated mesh protection can provide for quick restoration in the case of a transmission failure. Because redundant paths may be permanently active, however, dedicated mesh protection may result in inefficient allocation of network resources.

Alternatively, the network may provide for shared mesh protection in which traffic may be initially sent over a single primary path while a backup path may be reserved for use when necessary. In a shared mesh network, backup traffic is not necessarily transmitted at all times and, thus, it may be possible for multiple primary paths to share the same backup path. This sharing of backup paths may result in more efficient use of network resources compared to dedicated mesh protection.

In OTN networks, information may be encapsulated in frames known as optical data units ("ODUs"). An ODU may contain an optical channel payload unit ("OPU") along with ODU overhead. An OPU may contain an OPU payload, into which may be mapped a client signal, along with OPU overhead. ODU bandwidth may be quantized into discrete units. For example, in some applications, ODU bandwidth may be quantized into units of approximately 1.25 Gbps. ODUflex and standard ODU are examples that allow ODUs of bandwidth equal to integer multiples of 1.25 Gbps. The bandwidth of a particular ODU may thus be characterized as n×1.25 Gbps, where n is an integer. This is illustrated in the following chart.

| System bandwidth | ODUflex | Standard ODU |
|---|---|---|
| 10 Gbps | $1 \leq n \leq 8$ | n = 1, 2, 8 |
| 40 Gbps | $1 \leq n \leq 32$ | n = 1, 2, 8, 32 |
| 100 Gbps | $1 \leq n \leq 80$ | n = 1, 2, 8, 32, 80 |

ODUs may be categorized according to their size in terms of data rate capacity. For example, in standard ODU systems, ODU0, ODU1, ODU2, and ODU3 may have capacity for approximately 1.25 Gbps, 2.5 Gbps, 10 Gbps, and 40 Gbps, respectively.

The quantization of ODU bandwidth can result in low bandwidth utilization. For example, a demand requiring 0.5 Gbps is encapsulated in an ODU0 having 1.25 Gbps bandwidth. This results in wasted ODU bandwidth.

FIG. 1a illustrates bandwidth utilization in an OTN without demand packing Typically, two 0.5 Gbps demands 10a and 10b would each require a separate ODUs 12a and 12b, each having 1.25 Gbps bandwidth. For example, demand 10a would be encapsulated in ODU 12a, and demand 10b would be encapsulated in ODU 12b. Demands 10a and 10b each are encapsulated in ODUs with bandwidth that exceeds the total demand bandwidth, resulting in 1.5 Gbps of bandwidth underutilization.

FIG. 1b illustrates bandwidth utilization with demand packing. In this case, 0.5 Gbps demands 10a and 10b are instead both packed into a single 1.25 Gbps ODU 12c. By packing demands 10a and 10b into a single ODU, the bandwidth underutilization is reduced from 1.5 Gbps to 0.25 Gbps. Demands may be packed, for example, by end-to-end multiplexing as described in Jane M. Simmons, *Optical Network Design and Planning*, at 155-157 (2008). Where demands are packed in a shared ODU by multiplexing, the demands may subsequently be unpacked from the shared ODU by demultiplexing.

Shared mesh protection may be applied in an OTN network. Specifically, shared mesh protection in an OTN network may involve two steps. In the first step, all working demands may be routed. This may be done according to known methods. For example, working demands may be routed according to Dijkstra's algorithm, which selects the path having the lowest total measure of administrative weight. In some embodiments, administrative weight may be calculated in terms of link mileage (i.e., the physical length of a given path) or "hop count" (i.e., the number of discrete links in a path). In the second step, a disjoint backup path may be routed for each working demand. This second step may involve numerous sub-steps. First, resources allocated to the same SRLG of any working demand may be removed from consideration in routing backup paths. These resources may include, for example, IP links, light paths, and physical wavelengths. Second, the cost of each remaining resource may be adjusted. For example, each link may be assigned a cost of "1" or a cost proportional to its physical line length. Alternatively, the costs assigned to each resource may be adjusted according to more complicated methods, such as the partial information restoration (PIR) or full information restoration (FIR) algorithms described in G. Li et al., "Efficient Distributed Restoration Path Selection for Shared Mesh Restoration," *IEEE/ACM Trans. on Networking*, Vol. 11, No. 5, pp. 761-771 (October 2003). Third, shortest path routing, weighted by the adjusted cost for the resources under consideration, may be carried out for the disjoint shared path. Fourth, new backup resources may be added if needed. New resources may be added, for example, if there are insufficient backup resources assigned for backup demand routing. In some cases, additional backup resources may be obtained by reallocating previously unused bandwidth reserved for working demands. Finally, the resources that were removed from consideration in the first sub-step may be added back for consideration when routing the next working demand.

FIG. 2 depicts an example of shared mesh protection in an OTN 20 for multiple disjoint working demands, w1 and w2. Shared mesh protection allows multiple disjoint working demands to share backup resources. Working demand w1 originates at source node 22a and is destined for destination node 26a. In this embodiment, source node 22a and destination node 26a may lie outside of the core OTN network and may communicate traffic by non-optical technology. For example, source node 22a and destination node 26a may constitute parts of local networks that communicate traffic by means of wireless or electrical signals. In this example, nodes 24 are nodes in the core OTN. Working demand w1 is assigned a path through the core OTN passing through nodes 24a and 24d. Working demand w2 is assigned a path through the core OTN passing through nodes 24b and 24e. The assignment of paths for demands may be accomplished by a network management system. For example, a system such as Fujitsu's NetSmart may be used to route the working demand paths. Because the paths for demands w1 and w2 are disjoint, it is unexpected that a failure will occur to both simultaneously. Thus, it is possible for backup demands b1 and b2, corresponding to working demands w1 and w2, respectively, to share common resources. In this case, b1 and b2 share a common path 28 between nodes 24c and 24f.

FIG. 3 depicts an example of shared mesh protection in an OTN network 30 for multiple working demands w1 and w2 that share at least one common link 32 in the core OTN network. Working demand w1 originates at source node 22c and is destined for destination node 26c. Working demand w1 is assigned a path through the core OTN passing through nodes 24h, 24m, 24n and 24k. Working demand w2 originates at source node 22d and is destined for destination node 26d. Working demand w2 is assigned a path through the core OTN, passing through nodes 24i, 24m, 24n, and 24l. Because the paths assigned to w1 and w2 are not disjoint, a failure occurring on node 24m, node 24n, or link 32 will affect both working demands. Without demand packing, backup demands b1 and b2 must, therefore, be assigned disjoint resources in the OTN. Thus, in the example of FIG. 3, b1 and b2 may share path 34a, but use disjoint resources. For example, b1 and b2 may be assigned different optical wavelengths. Alternatively, b1 and b2 may be assigned different paths (e.g., 34b and 34c).

Figure 4:
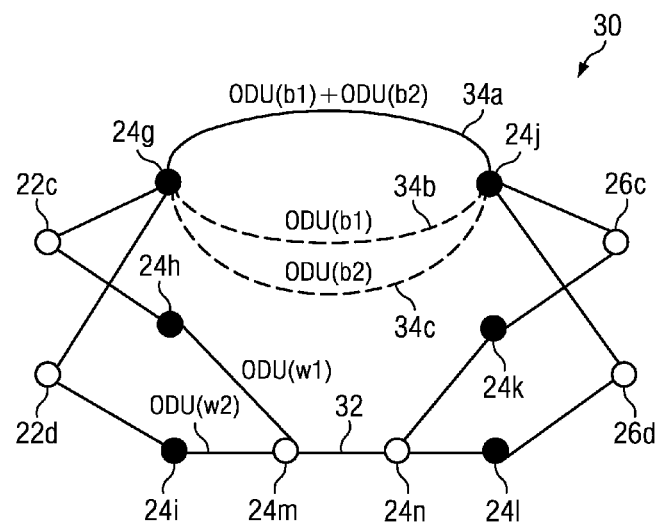
FIG. 4 depicts the routing of backup demands in the OTN illustrated in FIG. 3.

FIG. 4 depicts the routing of backup demands b1 and b2 in the OTN 30 of FIG. 3. Working demands w1 and w2 and backup demands b1 and b2 are assigned paths through the network 30 as discussed with respect to FIG. 3. Thus, working demand w1 will originate at source node 22c. At ingress node 24h, working demand w1 is encapsulated into an ODU, ODU(w1), for transmission through the OTN. ODU(w1) is transmitted along a path containing nodes 24h, 24m, 24n, and 24k. At egress node 24k, working demand w1 is unencapsulated from ODU(w1). Working demand w1 is then transmitted to destination node 26c. Similarly, working demand w2 will originate at source node 22d. At ingress node 24i, working demand w2 is encapsulated into an ODU, ODU(w2), for transmission through the OTN. ODU(w2) is transmitted along a path containing nodes 24i, 24m, 24n, and 24l. At egress node 24l, working demand w2 is unencapsulated from ODU(w2). Working demand w2 is then transmitted to destination node 26d. Because ODU(w1) and ODU(w2) are transmitted on a common link 32 between nodes 24m and 24n, disjoint backup resources must be reserved for ODUs carrying backup demands b1 and b2. Thus, in this example, the ODUs containing b1 and b2, ODU(b1) and ODU(b2), may be transmitted along common path 34a using disjoint resources (such as different wavelengths). Alternatively, ODU(b1) and ODU(b2) may be transmitted on disjoint paths, 34b and 34c, respectively. This separate assignment of disjoint backup resources results in low bandwidth utilization.

In the event of a failure of w1 to reach its destination, b1 will be transmitted along the backup path, starting at source 22c. At ingress node 24g, b1 is encapsulated into an ODU, ODU(b1), for transmission through the OTN. ODU(b2) proceeds to egress node 24j, where b1 is unencapsulated from ODU(b1) for transmission to destination node 26c. Similarly, in the event of a failure of w2 to reach destination 26d, b2 will be transmitted along the backup path starting at source 22d. At ingress node 24g, b2 is encapsulated into an ODU, ODU (b2). ODU(b2) proceeds to egress node 24j, where b2 is unencapsulated from ODU(b2) for transmission to destination node 26d.

The efficiency of shared mesh protection may be limited by the inability to share backup resources for non-disjoint working demands. By combining shared mesh protection with demand packing, this limitation may be overcome. In one aspect of the disclosure, therefore, backup demands corresponding to working demands that share a common link may be packed into a common ODU to improve bandwidth utilization in shared mesh protection networks.

Figure 5:
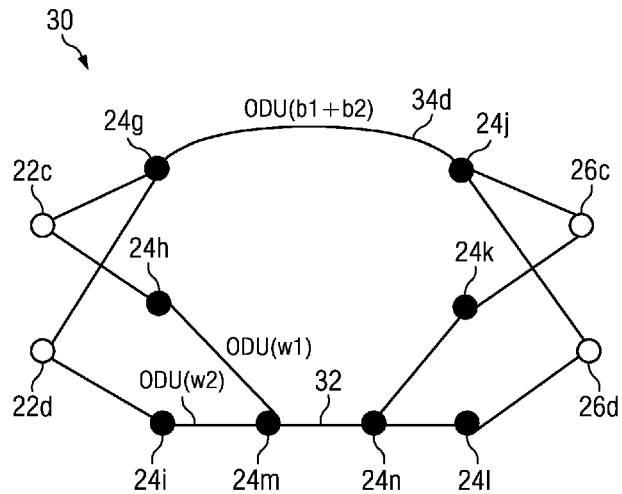
FIG. 5 depicts one embodiment of routing backup demands in an OTN shared mesh network, in which multiple working demands share at least one common link, with demand packing.

FIG. 5 depicts one embodiment of routing backup demands in an OTN network, in which multiple working demands share at least one common link with demand packing. As in FIG. 4, the paths assigned to working demands w1 and w2 share a common link 32. In systems without backup demand packing, disjoint backup resources would be reserved for ODUs carrying backup demands b1 and b2, thereby wasting network resources. By packing demands b1 and b2 into a single ODU, ODU(b1+b2) (as in FIG. 1b), the bandwidth underutilization is reduced or the unused bandwidth in ODU (b1+b2) may be less fragmented, compared to the case of ODU(b1)+ODU(b2). Thus, packing of backup demands results in more efficient use of network resources.

In the network of FIG. 5, a failure of either w1 or w2 to reach its respective destination will result in the transmission of the respective backup demand, b1 or b2, as described with respect to FIG. 4. The benefits of demand packing are realized in the case where both w1 and w2 fail to reach their respective destinations, possibly due to a failure at one or more of the shared link 32 and shared nodes 24m and 24n. In this case, both b1 and b2 are transmitted from their respective source nodes, 22c and 22d. At ingress node 24g, b1 and b2 are demand-packed into a single ODU, ODU(b1+b2). ODU(b1+b2) is transmitted along shared path 34d to egress node 24j, at which demands b1 and b2 are unpacked from ODU(b1+b2). Backup demand b1 is then transmitted to destination node 26c and backup demand b2 is transmitted to destination node 26d.

In some embodiments, backup demands may be packed when two conditions are satisfied. The first condition is that the relevant backup resources share a common ingress node and a common egress node in the OTN. This ensures that the backup demands enter the OTN at the same node, where they may be packed into a single ODU and exit the OTN at the same node, where they may be unpacked from the shared ODU. In the example of FIG. 5, b1 and b2 share ingress node 24g and egress node 24j. The second condition is that the relevant working resources share one common link. In the example of FIG. 5, w1 and w2 share link 32 between nodes 24m and 24n. If these conditions are met, ODU(b1+b2) may typically be routed on any path between a common ingress node and a common egress node on the network that does not include any link in the paths of working demands w1 or w2. In other words, the backup path typically does not include any resource in the SRLG for working demands w1 or w2.

Backup demand packing may involve a trade-off. In general, the efficiency of network resource utilization may increase as more backup demands are packed into a given ODU. However, as more backup demands are packed into an ODU, it may become more difficult to find a suitable backup path through the network. Each time a backup resource, $b_i$, is packed with other resources in an ODU, the resources associated with the corresponding working demand, $w_i$, one typically removed from consideration in routing the backup ODU. Packing may, therefore, leave fewer resources on which to route the backup path. Given this trade-off, in one embodiment, backup demands corresponding to disjoint working demands are not packed in the same ODU.

Figure 6B:
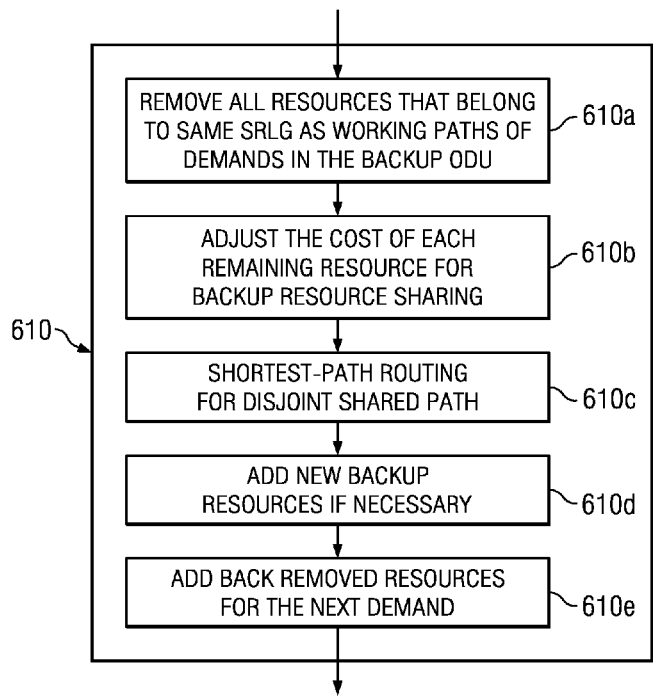
FIGS. 6a and 6b are block diagrams depicting an exemplary method for routing backup demands in an OTN network with shared mesh protection and demand packing according to a route-first algorithm.
Figure 6A:
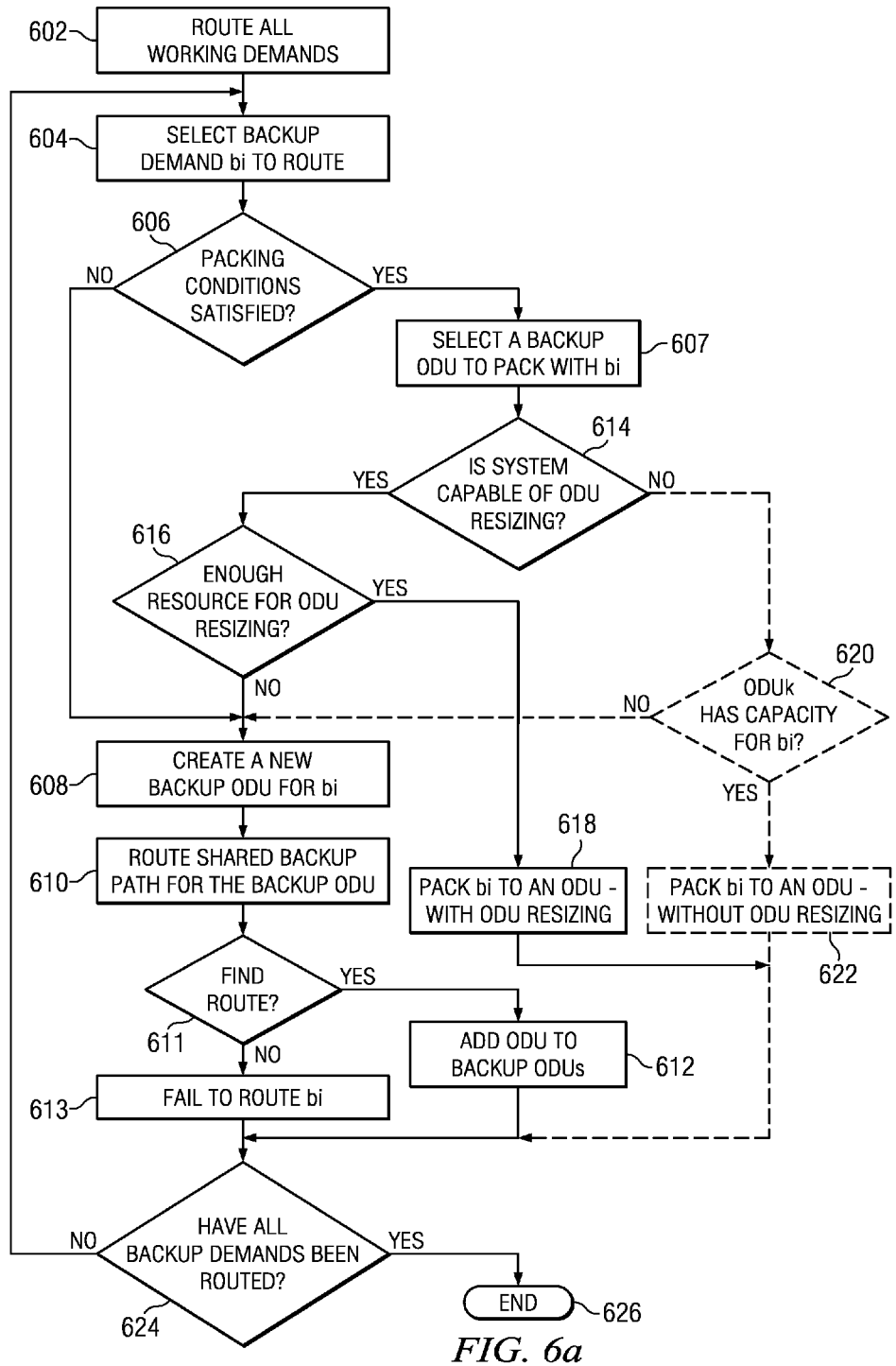

FIG. 6a is a block diagram depicting an exemplary method for routing backup demands in an OTN network with shared mesh protection and demand packing according to a route-first algorithm. In step 602, all working demands are routed through the network. For example, this routing may be done by a shortest-path method which may account for one or more measures of resource costs. Step 604 selects a backup demand, $b_i$, to be routed.

The method proceeds to step 606, which determines whether the packing conditions are satisfied for $b_i$. As discussed above, the packing conditions are, first, that the relevant backup resources share a common ingress node and a common egress node and, second, that the working resources corresponding to the relevant backup resources share one common link. If the packing conditions are not satisfied, the method proceeds to step 608. Because the packing conditions relate to a comparison between information corresponding to two or more backup resources, the packing conditions will not be satisfied if $b_i$ is the first backup resource to be routed.

Step 608 creates a new backup ODU for the current backup demand $b_i$. Next, step 610 routes a shared backup path for the ODU created in step 608.

FIG. 6b illustrates step 610 in further detail. In step 610a, resources (such as IP links, lightpaths, and physical wavelengths) belonging to the SRLG of the working paths corresponding to the demands in the backup ODU are removed from consideration. Next, in step 610b, the cost of each resource remaining in consideration after step 610a is adjusted for backup resource sharing. Several examples for cost adjusting are discussed above. Next, in step 610c, shortest-path routing is employed to route the disjoint shared path for the backup ODU. In step 610d, new backup resources are added if necessary. As discussed above, new backup resources may be obtained by reallocating unused resources previously reserved for working demands. In step 610e, the resources removed from consideration in step 610a are reintroduced for consideration when routing the next demand.

Returning to FIG. 6a, after step 610, the method may proceed to step 611 in which it is determined whether there is a route and/or capacity available for the ODU created in step 608. If there is not a route and/or capacity available for the new ODU at step 613, $b_i$ will fail to be routed and method 600 may proceed to step 624. However, if there is a route and/or capacity available for the new ODU, method 600 may proceed to step 612, in which the ODU created in step 608 is added to the set of backup ODUs available for demand-packing. The method then proceeds to step 624, which determines whether all backup demands have been routed. If all backup demands have been routed, the method ends at step 626. If step 624 determines that one or more backup demands have not been routed, the method proceeds back to step 604, and selects a new backup demand to route.

Returning to step 606, if for a backup demand to be routed, $b_i$, the packing conditions are satisfied, the method proceeds to step 607. Step 607 selects a backup ODU to pack with $b_i$. Following step 607, method 600 may proceed to step 614. Step 614 determines whether the network is capable of ODU resizing.

If the network is capable of ODU resizing, the method proceeds to step 616, which determines whether the network has sufficient resources to allow ODU resizing. If the network does not have sufficient resources for ODU resizing, the method proceeds to step 608. If the network does have sufficient resources for ODU resizing, the method proceeds instead to step 618, which packs the backup demand $b_i$ to an existing ODU and, if necessary, resizes the ODU. Resizing may involve using a larger ODU size determined by the index number. For example, an ODU0, which has capacity for 1.25 Gbps may be resized to an ODU1, which has capacity for 2.5 Gbps. The method then proceeds to step 624 to determine whether another backup demand exists to be routed.

Returning to step 614, if the network is not capable of ODU resizing, the method instead proceeds to step 620. Step 620 determines whether an existing backup ODU has capacity for the current backup demand $b_i$. If no existing backup ODU has capacity for $b_i$, the method proceeds to step 608. If, however, an existing backup ODU has capacity for $b_i$, the method proceeds instead to step 622, in which $b_i$ is packed into an existing ODU. Packing may be done, for example, by end-to-end multiplexing. After step 622, the method proceeds to step 624 to determine whether another backup demand exists to be routed.

Figure 7:
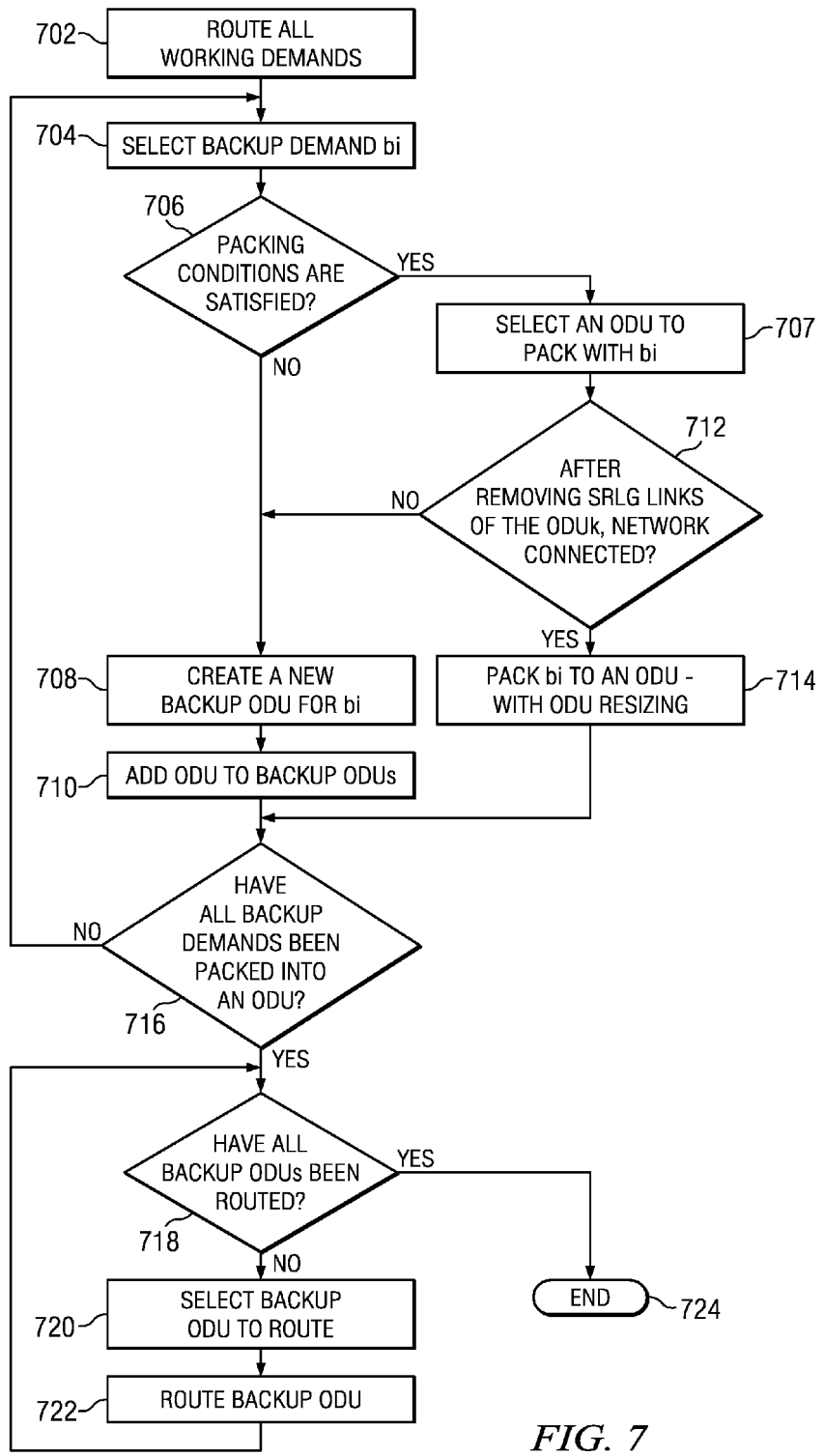
FIG. 7 is a block diagram depicting an exemplary method for routing backup demands in an OTN network with shared mesh protection and demand packing according to a pack-first algorithm.

FIG. 7 is a block diagram depicting an exemplary method for routing backup demands in an OTN network with shared mesh protection and demand packing according to a pack-first algorithm. In step 702, all working demands are routed through the network. Working demands may be routed, for example, by employing a shortest-path method which may account for one or more measures of adjusted link cost. Step 704 selects a backup demand corresponding to one of the working demands routed in step 702. The method then proceeds to step 706, which determines whether the packing conditions are satisfied for $b_i$.

If the packing conditions are not satisfied in step 706, the method proceeds to step 708. For example, as discussed with respect to FIG. 6, the packing conditions will not be satisfied if $b_i$ is the first backup resource to be packed. Step 708 creates a new backup ODU for the current backup demand $b_i$. Next, step 710 adds the backup ODU created in step 708 to the set of backup ODUs available for demand-packing. The method then proceeds to step 716, which determines whether all backup demands have been packed into an ODU. If in step 716 it is determined that one or more backup demands have not been packed into an ODU, the method returns to step 704 and selects a backup demand to pack. If, however, step 716 reveals that all backup demands have been packed into an ODU, the method proceeds to step 718 (described in more detail, below).

Returning to step 706, if the packing conditions are satisfied for $b_i$, the method proceeds instead to step 707 where a backup ODU to pack with $b_i$ may be selected. Following step 707, method 700 may proceed to step 712. Step 712 determines whether, after removing from consideration the SRLG of the working demands corresponding to the backup demands contained in the selected ODU, as well as the working demand of $b_i$, a backup path exists through the network. If no such path exists, the method proceeds to step 708, in which a new backup ODU is created for $b_i$. If, however, step 712 determines that a backup path does exist, the method proceeds to step 714. In step 714, $b_i$ is packed into the selected ODU. In the particular embodiment of FIG. 7, it is assumed that the system is capable of ODU resizing. Alternatively, the method may provide an alternative to pack backup demands into an ODU without ODU resizing, as described with respect to FIG. 6. The method then proceeds to step 716 to determine whether another backup demand requires packing.

If step 716 determines that all backup demands have been packed into an ODU, the method proceeds to step 718. Step 718 determines whether all backup ODUs have been routed. If all backup ODUs have been routed, the method then ends at step 724. If, however, step 718 determines that not all backup ODUs have been routed, the method proceeds to step 720 which selects a backup ODU to route. Next, step 722 routes the backup ODU according to the method described with respect to step 610 in FIG. 6b. The method then returns to step 718 to determine whether another backup ODU requires routing.

Various embodiments of the present disclosure provide for more efficient allocation of backup resources in an OTN employing shared mesh restoration. By packing backup demands into a single ODU, some embodiments allow backup demands corresponding to non-disjoint working demands to be compactly allocated inside quantized ODUs, thereby improving the efficiency of network resource allocation.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for shared mesh protection in an optical transport network, comprising the steps of:
provisioning a route for each of a plurality of working demands through the optical transport network, wherein each of the plurality of the working demands is a demand of an arbitrary bandwidth;
provisioning a route for backup demands corresponding to each of the plurality of working demands;
packing into a single optical data unit a first backup demand corresponding to a first of the plurality of working demands and a second backup demand corresponding to a second of the plurality of working demands, wherein the first and second of the plurality of working demands share at least one common link in the optical transport network, wherein the first backup demand has a first bandwidth and the second backup demand has a second bandwidth, wherein the single optical data unit may have one of a plurality of discrete bandwidth sizes, wherein the bandwidth of the single optical data unit is selected to be the smallest of the plurality of discrete bandwidth sizes that is greater than the sum of the first bandwidth and the second bandwidth, and wherein the step of packing comprises:
selecting the first backup demand;
determining whether the single optical data unit has capacity for the first backup demand;
if the single optical data unit has capacity for the first backup demand, packing the first backup demand into the single optical data unit;
determining whether all backup demands corresponding to each of the plurality of working demands have been routed;
if all backup demands corresponding to each of the plurality of working demands have not been routed, determining whether the single optical data unit has capacity for the second backup demand; and
if the single optical data unit has capacity for the second backup demand, packing the second backup demand into the single optical data unit; and
unpacking the first and second backup demands from the optical data unit.

2. The method of claim 1, wherein the first and second backup demands share a common ingress node and common egress node.

3. The method of claim 2, wherein the working demands are routed according to a shortest-path algorithm.

4. The method of claim 3, wherein the step of provisioning the route for backup demands is performed after the step of packing into the single optical data unit the first backup demand and the second backup demand and further comprises routing a backup path through the network for the optical data unit.

5. The method of claim 4, wherein the step of routing the backup path for the optical data unit further comprises the steps of:
removing from consideration network resources belonging to a shared resource link group of the plurality of working demands;
calculating a cost of each remaining resource;
calculating a cost-adjusted shortest-path through the network; and
selecting the cost-adjusted shortest-path as the backup path.

6. The method of claim 3, wherein the step of provisioning the route for backup demands is performed after the first backup demand is packed into the optical data unit and before the second backup demand is packed into the optical data unit, and further comprises routing a backup path through the network for the optical data unit.

7. The method of claim 6, wherein the step of routing the backup path for the optical data unit further comprises the steps of:
removing from consideration network resources belonging to a shared resource link group of the plurality of working demands;
calculating a cost of each remaining resource;
calculating a cost-adjusted shortest-path through the network; and
selecting the cost-adjusted shortest-path as the backup path.

8. An optical transport network comprising:
a plurality of nodes configured to transmit and receive network traffic;
a plurality of links configured to communicate traffic between nodes, wherein each link connects two nodes;
a network management system configured to provision a route for each of a plurality of working demands through the optical transport network and to provision routes for backup demands corresponding to each of the plurality of working demands, wherein each of the plurality of the working demands is a demand of an arbitrary bandwidth;
an ingress node configured to pack into a single optical data unit a first backup demand corresponding to a first of the plurality of working demands and a second backup demand corresponding to a second of the plurality of working demands, wherein the first and second of the plurality of working demands share at least one common link in the optical transport network, wherein the first backup demand has a first bandwidth and the second backup demand has a second bandwidth, wherein the single optical data unit may have one of a plurality of discrete bandwidth sizes, wherein the bandwidth of the single optical data unit is selected to be the smallest of the plurality of discrete bandwidth sizes that is greater than the sum of the first bandwidth and the second bandwidth, and wherein the ingress node is further configured to:
select the first backup demand;
determine whether the single optical data unit has capacity for the first backup demand;

if the single optical data unit has capacity for the first backup demand, pack the first backup demand into the single optical data unit;

determine whether all backup demands corresponding to each of the plurality of working demands have been routed;

if all backup demands corresponding to each of the plurality of working demands have not been routed, determine whether the single optical data unit has capacity for the second backup demand; and if the single optical data unit has capacity for the second backup demand, pack the second backup demand into the single optical data unit; and an egress node configured to unpack the first and second backup demands from the optical data unit.

9. The optical transport network of claim 8, wherein the network management system is further configured to provision routes for the working demands according to a shortest-path algorithm.

10. The optical transport network of claim 9, wherein the network management system is further configured to provision the route for the backup demands after the first and second backup demands are packed into the optical data unit.

11. The optical transport network of claim 10, wherein the network management system is further configured to:
remove from consideration network resources belonging to a shared resource link group of the plurality of working demands;
calculate a cost of each remaining resource;
calculate a cost-adjusted shortest-path through the network; and
select the cost-adjusted shortest-path as a backup path.

12. The optical transport network of claim 8, wherein the ingress node is further configured to pack the first backup demand into the optical data unit before the network management system provisions the route for the backup demands.

13. The optical transport network of claim 12, wherein the ingress node is further configured to pack the second backup demand into the optical data unit after the network management system provisions the route for the backup demands.

14. The optical transport network of claim 13, wherein the network management system is further configured to:
remove from consideration network resources belonging to a shared resource link group of the plurality of working demands;
calculate a cost of each remaining resource;
calculate a cost-adjusted shortest-path through the network; and
select the cost-adjusted shortest-path as a backup path.

15. An article of manufacture, comprising:
a computer readable medium;
computer-executable instructions carried on the computer readable medium, the instructions readable by a processor, the instructions, when executed, for causing the processor to:
provision a route for each of a plurality of working demands through an optical transport network, wherein each of the plurality of the working demands is a demand of an arbitrary bandwidth;
provision a route for backup demands corresponding to each of the plurality of working demands;
pack into a single optical data unit a first backup demand corresponding to a first of the plurality of working demands and a second backup demand corresponding to a second of the plurality of working demands, wherein the first and second of the plurality of working demands share at least one common link in the optical transport network, wherein the first backup demand has a first bandwidth and the second backup demand has a second bandwidth, wherein the single optical data unit may have one of a plurality of discrete bandwidth sizes, wherein the bandwidth of the single optical data unit is selected to be the smallest of the plurality of discrete bandwidth sizes that is greater than the sum of the first bandwidth and the second bandwidth, and wherein the computer readable medium further carries computer-executable instructions, when executed, for causing the processor to:
select the first backup demand;
determine whether the single optical data unit has capacity for the first backup demand;
if the single optical data unit has capacity for the first backup demand, pack the first backup demand into the single optical data unit;
determine whether all backup demands corresponding to each of the plurality of working demands have been routed;
if all backup demands corresponding to each of the plurality of working demands have not been routed, determine whether the single optical data unit has capacity for the second backup demand; and
if the single optical data unit has capacity for the second backup demand, pack the second backup demand into the single optical data unit; and
unpack the first and second backup demands from the optical data unit.

16. The article of manufacture of claim 15, wherein the first and second backup demands share a common ingress node and common egress node.

17. The article of manufacture of claim 16, further including instructions, when executed, for causing the processor to provision the route for each of the working demands according to a shortest-path algorithm.

18. The article of manufacture of claim 17, further including instructions, when executed, for causing the processor to provision the route for backup demands after packing into the single optical data unit the first backup demand and the second backup demand.

19. The article of manufacture of claim 18, further including instructions, when executed, for causing the processor to:
remove from consideration network resources belonging to a shared resource link group of the plurality of working demands;
calculate a cost of each remaining resource;
calculate a cost-adjusted shortest-path through the network; and
select the cost-adjusted shortest-path as a backup path.

20. The article of manufacture of claim 17, further including instructions, when executed, for causing the processor to:
pack the first backup demand into the optical data unit before provisioning the route for the backup demands; and
pack the second backup demand into the optical data unit after provisioning the route for the backup demands.

21. The article of manufacture of claim 20, further including instructions, when executed, for causing the processor to:
remove from consideration network resources belonging to a shared resource link group of the plurality of working demands;
calculate a cost of each remaining resource;
calculate a cost-adjusted shortest-path through the network; and
select the cost-adjusted shortest-path as a backup path.

* * * * *